(12) United States Patent  
Goldberg et al.

(10) Patent No.: US 12,380,416 B1
(45) Date of Patent: Aug. 5, 2025

(54) LIFECYCLE ITEM CRYPTOGRAPHIC DIGITAL ASSET MARKETPLACE VERIFIABLE BY COMPLIANCE AUTHORITY DATA

(71) Applicant: CFT Exchange Corp., Short Hills, NJ (US)

(72) Inventors: Melissa S. Goldberg, Short Hills, NJ (US); Elijah D. Goldberg, Short Hills, NJ (US); Lewis D. Goldberg, Short Hills, NJ (US)

(73) Assignee: CFT Exchange Corp., Short Hills, NJ (US)

( * ) Notice: Subject to any disclaimer, the term of this patent is extended or adjusted under 35 U.S.C. 154(b) by 322 days.

(21) Appl. No.: 17/863,607

(22) Filed: Jul. 13, 2022

Related U.S. Application Data

(60) Provisional application No. 63/221,335, filed on Jul. 13, 2021.

(51) Int. Cl.
*G06Q 20/12* (2012.01)
*G06Q 20/38* (2012.01)

(52) U.S. Cl.
CPC ....... *G06Q 20/1235* (2013.01); *G06Q 20/389* (2013.01); *G06Q 2220/165* (2013.01)

(58) Field of Classification Search
CPC ............ G06Q 20/1235; G06Q 20/389; G06Q 2220/165
USPC ........................................................ 705/51
See application file for complete search history.

(56) References Cited

U.S. PATENT DOCUMENTS

| 10,628,756 B1 | 4/2020 | Kuper et al. |
| 10,863,724 B2 | 12/2020 | Moss et al. |
| 10,878,429 B2 | 12/2020 | Bakalis |
| 10,897,877 B2 | 1/2021 | Hicks et al. |

(Continued)

OTHER PUBLICATIONS

Borah, M.D., et al., Supply chain management in agriculture using blockchain and IoT, Advanced applications of blockchain technology, pp. 227-242, retrieved from internet at: https://www.researchgate.net/profile/Ripon-Patgiri/publication/336071540_Supply_Chain_Management_in_Agriculture_Using_Blockchain_and_IoT/links/5ee0f48d299bf1d20bdedec7/Supply-Chain-Management-in-Agriculture-Using-Blockchain-and-IoT.pdf, dated 2020, 17 pages.

(Continued)

*Primary Examiner* — Courtney P Jones
(74) *Attorney, Agent, or Firm* — Nutter McClennen & Fish LLP

(57) ABSTRACT

A cryptographic digital asset (CDA) marketplace for monitoring a lifecycle item through an item lifecycle leverages data provided to a compliance authority. A CDA is created based on an identifier associated with the lifecycle item used to report lifecycle item information to the compliance authority. The CDA is recorded in a digital ledger and is presented for sale through an online marketplace. After sale, a final disposition of the lifecycle item reported to the compliance authority is received. This final disposition represents one of (a) a predetermined successful completion event or (b) an unsuccessful completion event, and is verifiable using the information reported to the compliance authority. The CDA is updated in the digital ledger, and when the final disposition is associated with the predetermined successful completion event, distribution of funds is initiated directly or indirectly from the operator account to the user account for a predetermined redemption value.

29 Claims, 10 Drawing Sheets

(56) References Cited

U.S. PATENT DOCUMENTS

| | | |
|---|---|---|
| 11,037,211 B2 | 6/2021 | Preston et al. |
| 11,188,977 B2 | 11/2021 | Youb et al. |
| 2017/0316237 A1 | 11/2017 | Dagdelen Uysal et al. |
| 2017/0323126 A1 | 11/2017 | Dagdelen Uysal et al. |
| 2019/0303846 A1* | 10/2019 | Kaweske ............... G16H 20/10 |
| 2020/0097900 A1 | 3/2020 | Kibbey et al. |
| 2020/0279211 A1 | 9/2020 | Gillett |
| 2020/0320473 A1 | 10/2020 | Kibbey et al. |
| 2020/0359550 A1 | 11/2020 | Tran et al. |
| 2021/0088494 A1* | 3/2021 | Nagar .................... G06Q 20/20 |
| 2021/0182869 A1* | 6/2021 | Davis ................. G06Q 20/3827 |
| 2021/0279695 A1* | 9/2021 | Rice ....................... G06Q 20/12 |
| 2021/0365915 A1 | 11/2021 | Kaufman et al. |
| 2021/0374695 A1* | 12/2021 | Hanisch ................. G06Q 20/12 |
| 2022/0012712 A1 | 1/2022 | Dagdelen Uysal et al. |
| 2022/0027586 A1 | 1/2022 | Dagdelen Uysal et al. |
| 2022/0027992 A1 | 1/2022 | Blevins |
| 2022/0076204 A1 | 3/2022 | Kibbey et al. |
| 2022/0092669 A1 | 3/2022 | Abrahamian et al. |
| 2022/0147953 A1 | 5/2022 | Audino et al. |
| 2022/0261882 A1* | 8/2022 | Youb ..................... G06Q 50/16 |
| 2022/0270036 A1 | 8/2022 | Dagdelen Uysal et al. |
| 2022/0295716 A1 | 9/2022 | Mueller et al. |
| 2022/0298501 A1 | 9/2022 | Zhang et al. |
| 2022/0335417 A1* | 10/2022 | Regenor ............ G06Q 20/3678 |
| 2022/0375013 A1* | 11/2022 | Chijik .................. G06Q 50/184 |
| 2022/0414649 A1* | 12/2022 | Shannon, III ............. H04L 9/50 |
| 2023/0327866 A1* | 10/2023 | Andon .................. H04L 9/0643 380/44 |

OTHER PUBLICATIONS

Dos Santos, R., et al., Third Party Certification of Agri-Food Supply Chain Using Smart Contracts and Blockchain Tokens, Sensors 21, No. 16: 5307, retrieved from the internet at: https://www.mdpi.com/1424-8220/21/16/5307/pdf, Mar. 2, 2022, 20 pages.

James, A., TraceHarvest blockchain network for full lifecycle track and trace, Food & Farming Technology, retrieved from the internet at: https://www.foodandfarmingtechnology.com/news/sowing-and-planting/traceharvest-blockchain-network-for-full-lifecycle-track-and-trace.html, Nov. 20, 2020, 8 pages.

Kumarathunga, M., et al., Smart Agricultural Futures Market: Blockchain Technology as a Trust Enabler between Smallholder Farmers and Buyers, Sustainability 14, No. 5: 2916, dated Mar. 2, 2022, retrieved from the internet at: https://www.mdpi.com/2071-1050/14/5/2916/pdf, 22 pages.

Westerkamp, M., et al., Tracing manufacturing processes using blockchain-based token compositions, Digital Communications and Networks 6, No. 2: 167-176, retrieved from the internet on May 1, 2020 at: https://www.sciencedirect.com/science/article/pii/S235286481830244X, 22 pages.

\* cited by examiner

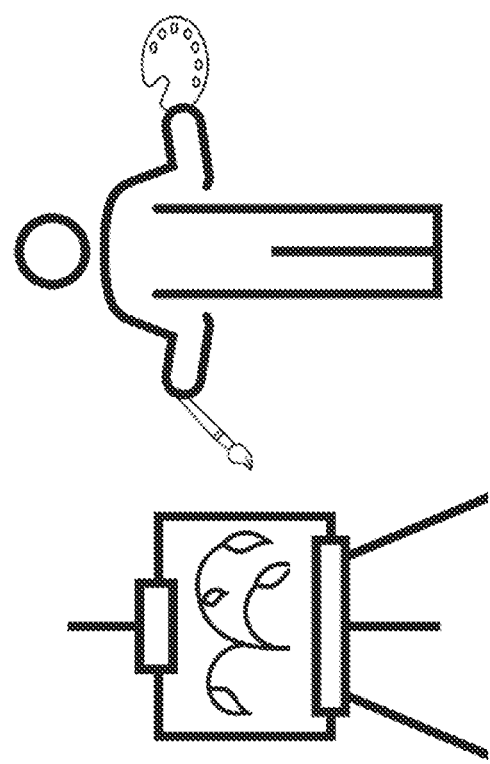
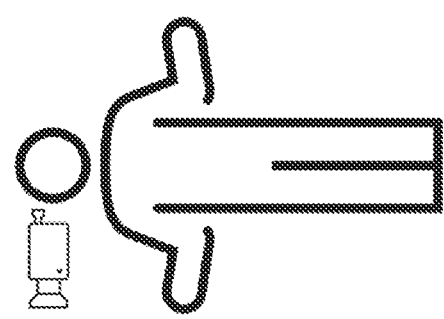
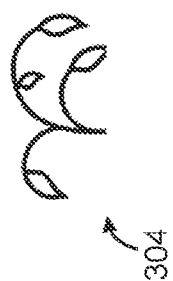
FIG. 3B
FIG. 3A

LIFECYCLE ITEM CRYPTOGRAPHIC DIGITAL ASSET MARKETPLACE VERIFIABLE BY COMPLIANCE AUTHORITY DATA

CROSS-REFERENCE TO RELATED APPLICATION(S)

This patent application claims the benefit of U.S. Provisional Patent Application No. 63/221,335 entitled SYSTEMS AND METHODS FOR CREATING AND MONITORING ITEM LIFECYCLE MANAGED BY A DATABASE AND USES THEREOF filed Jul. 13, 2021, which is hereby incorporated herein by reference in its entirety.

FIELD

The present disclosure relates to creating and monitoring item lifecycle and recording the item lifecycle in a database and uses thereof.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. All patents, patent applications, publications and products mentioned herein, if any, are hereby incorporated by reference in their entirety.

In 1995, California passed Proposition 215, which created the first, state-regulated, medical cannabis market in the U.S. Subsequently, 35 states created state-regulated, medical cannabis markets. In 2012, Colorado and Washington passed adult-use recreational cannabis measures. Since then, 16 additional U.S. states, 2 U.S. territories, and the District of Columbia legalized cannabis for adult-use recreational. Due to increased legalization, the cannabis industry has become highly regulated. For example, the U.S. state and local governments have imposed traceability/tracking regulations, resulting in the creation of multiple traceability/tracking systems with extensive tracking and reporting capabilities to assist state and local governments with enforcing regulations, collecting taxes, verifying product quality, and preventing illegal cannabis inversion and diversion. Such systems collect seed-to-sale information such as cultivation, processing, point-of-sale, quality assurance testing, transportation, compliance, or a combination thereof. With increased regulation comes increased costs imposed on industry participants, resulting a potential need for industry participants to find ways to increase revenue and/or capital while responding to increasing regulatory demands.

SUMMARY

The invention described and claimed herein has many attributes and aspects including, but not limited to, those set forth or described or referenced in this Summary. It is not intended to be all-inclusive, and the invention described and claimed herein are not limited to or by the features or embodiments identified in this Summary, which is included for purposes of illustration only and not restriction. Further areas of applicability of the present disclosure will become apparent from the detailed description, the claims, and the drawings.

Embodiments may include a method, system, and computer program product for providing a cryptographic digital asset marketplace for monitoring a lifecycle item through an item lifecycle by a commodities fungible token (CFT) application in a manner that is verifiable using data provided to a compliance authority, wherein the lifecycle item is a regulated lifecycle item that is subject to mandated tracking and compliance reporting to the compliance authority and is associated with an identifier used by an operator to report lifecycle item information to a compliance authority. Such monitoring includes receiving, by the CFT application, an identifier associated with the lifecycle item used by the operator to report lifecycle item information to the compliance authority; receiving, by the CFT application, a set of characteristics for the lifecycle item; causing, by the CFT application, creation of a cryptographic digital asset for the lifecycle item and recording of the cryptographic digital asset in a digital ledger, the cryptographic digital asset being associated with the identifier and the set of characteristics; presenting, by the CFT application, the cryptographic digital asset for sale through a marketplace accessible over a communication network, the marketplace enabling purchase of the cryptographic digital asset by a user via a user device over the communication network; receiving, by the CFT application, notification of a purchase operation for purchase of the cryptographic digital asset by the user, wherein the purchase operation is associated with a sale price for the cryptographic digital asset and a redemption value for the cryptographic digital asset that is greater than the sale price and is conditional on a predetermined successful completion event; causing, by the CFT application, updating of the cryptographic digital asset in the digital ledger to identify the user as an owner of the cryptographic digital asset and to include the sale price and the redemption value; initiating, by the CFT application, distribution of funds directly or indirectly from a user account to an operator account for the sale price; receiving, by the CFT application, a final disposition of the item that is reported to the compliance authority, the final disposition representing one of (a) a successful completion event defined for the item or (b) an unsuccessful completion event defined for the item, and being verifiable using the information reported to the compliance authority; causing, by the CFT application, updating of the cryptographic digital asset in the digital ledger based on the final disposition of the item; and when the final disposition is associated with a predetermined successful completion event defined for the item, initiating, by the CFT application, distribution of funds directly or indirectly from the operator account to the user account for the redemption value.

In various alternative embodiments, presenting the cryptographic digital asset for sale through a marketplace may involve presenting the cryptographic digital asset pre-mint or alternatively may involve minting the cryptographic digital asset and presenting the minted cryptographic digital asset for sale. The identifier may include at least one of an RFID, a barcode, or a quick release (QR) code. The lifecycle item may be an agricultural item or product of an agricultural item. The set of characteristics may include at least one of an item description, an item type, an item size, an item photograph or drawing, item health data, item appearance data, or a timestamp. The cryptographic digital asset may be a token, fungible token, or non-fungible token (NFT). At least some of the characteristics may be stored in a database associated with the CFT application. The identifier, the characteristics, and/or the final disposition may be received from the operator via an operator input device (e.g., an operator device, an item scanner, a web-based interface, etc.) and/or may be received directly or indirectly from an operator tracking system (e.g., provided in paper form or electronic form).

In further additional or alternative embodiments, the CFT application may generate a smart contract for the cryptographic digital asset including the redemption value and may update the ledger to include the smart contract. The CFT application may provide an interface through which the operator and the user can negotiate at least one of the sale price or the redemption value. The CFT application may receive subsequent information for the lifecycle item (e.g., from an operator input device and/or from an operator tracking system) and may update the cryptographic digital asset based on the subsequent information. The CFT application may present performance information for the operator relating to past lifecycle items offered by the operator through the CFT application so that the user can evaluate the sale price or redemption value.

Additional embodiments may be disclosed and claimed.

BRIEF DESCRIPTION OF THE DRAWINGS

The accompanying drawings, which are incorporated herein and form a part of the specification, illustrate the aspects of the present disclosure and, together with the description, further server to explain the principles of the aspects and to enable a person skilled in the pertinent art to make and use the aspects. In the drawings, reference numbers may be reused to identify similar and/or identical elements. The drawings are for illustration purposes only, show exemplary non-limiting embodiments, and are not necessarily drawn to scale.

FIGS. 3A and 3B are illustrations depicting creation of art to be used to mint a cryptographic digital asset (such as fungible token or NFT) for sale on a commodities fungible token (CFT) system, in accordance with some embodiments of the present disclosure.

Figure 1A:
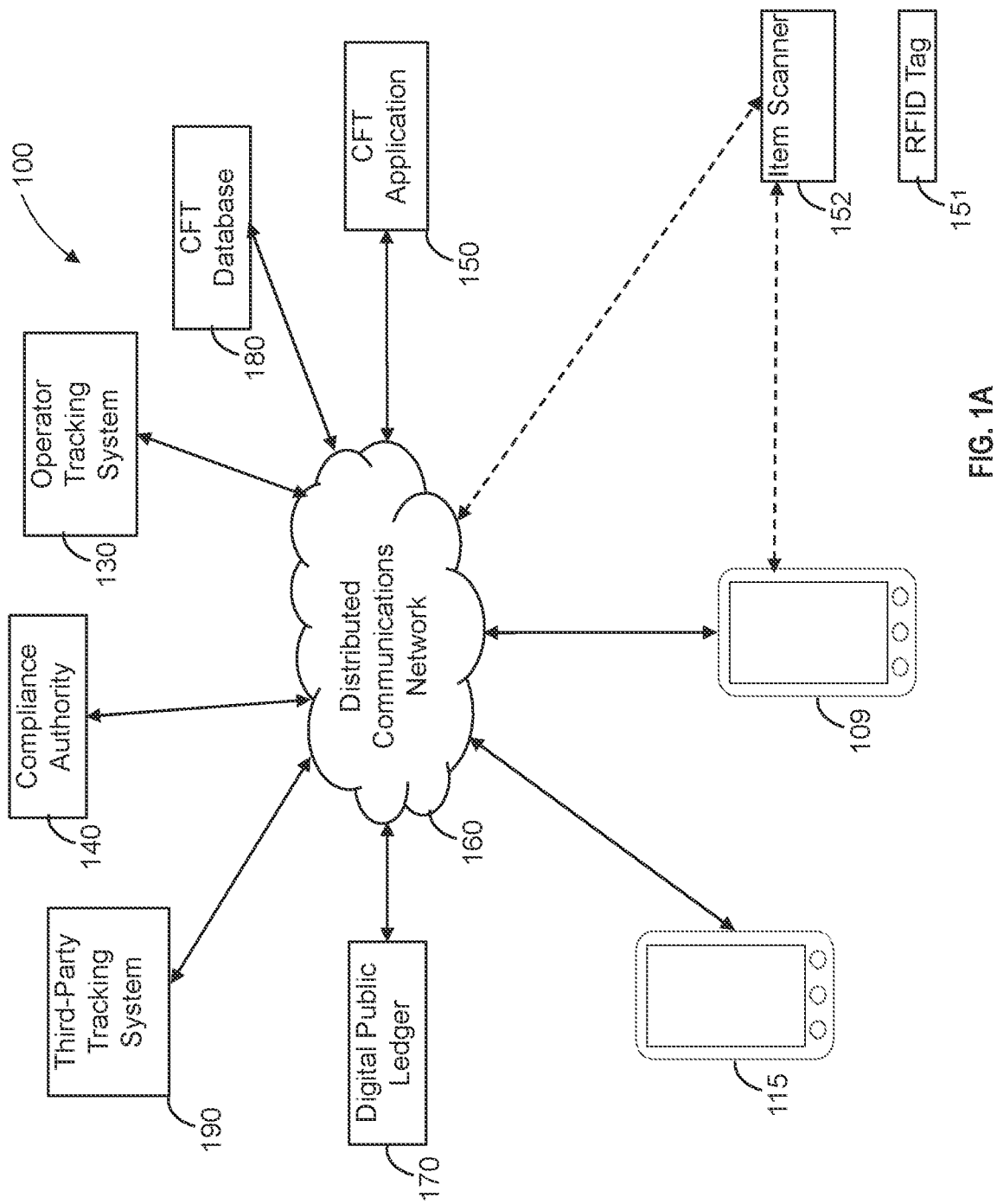
FIG. 1A is a functional block diagram of an example service contract exchange system, in accordance with some embodiments of the present disclosure.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DETAILED DESCRIPTION

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the subject matter described.

The following description is provided as an enabling teaching of a representative set of examples. Many changes can be made to the embodiments described herein while still obtaining beneficial results. Some of the desired benefits discussed below can be obtained by selecting some of the features discussed herein without utilizing other features. Accordingly, many modifications and adaptations, as well as subsets of the features described herein are possible and can even be desirable in certain circumstances. Thus, the following description is provided as illustrative and is not limiting.

As used herein, use of a singular article such as "a," "an" and "the" is not intended to exclude pluralities of the article's object unless the context clearly and unambiguously dictates otherwise. Thus, for example, "an" item may include one or more item.

As used herein, a "set" of items includes one or more of such items unless the context clearly and unambiguously dictates otherwise.

As used herein, a "lifecycle item" is an item that can be monitored through some or all an item lifecycle from a predetermined starting event to a predetermined completion event (e.g., a growth or production lifecycle) or a product of such an item. Exemplary embodiments disclosed herein generally apply to regulated lifecycle items (particularly, although not limited to, regulated agricultural lifecycle items) that are subject to mandated tracking and compliance reporting, such as, for example, a plant, a cannabis plant, a product comprising cannabis or the plant, a product comprising some or all of the plant (which includes, for example, but not limited to, seed, leaf, flower, fruit, branch, stem, stalk, root, spine, crown, trunk, arm, rib, joint, tissue, skin, pith, tissue, areole, pollen, or a combination thereof), the cannabis plant, or other agricultural product (such as, for example, but not limited to, a regulated agricultural product, hemp, peyote, iboga, hops, morning glory, morning glory seeds, opium poppy, a psychoactive plant or fungi, or a plant or fungi containing one or more psychoactive compounds (such as, but not limited to, tetrahydrocannabinol (THC), psilocybin, mescaline, ibogaine, lysergic acid amide, N,N-Dimethyltryptamine (DMT), 5 Methoxy-Dimethyltryptamine (5MEO-DMT), caffeine, nicotine, morphine, cocaine, ephedrine, opium, the like, or a combination thereof)). Thus, for example, a lifecycle item could be a plant that can be monitored such as from seed or planting (i.e., starting event) to harvest or destruction (i.e., completion event), an animal that can be monitored such as from conception or birth (i.e., starting event) to maturity, slaughter, or death (i.e., completion event), a product (e.g., wine, beer, whiskey, cheese, etc.) that can be monitored such as from the start of production (i.e., starting event) to the end of production (i.e., completion event), etc. Lifecycle items also can include non-agricultural lifecycle items such as, for example, items to be constructed, manufactured, assembled, etc. Some lifecycle items may be regulated (e.g., by a government or other regulatory body) and in some cases additionally or alternatively may be tracked such as using a third-party tracking system mandated by a compliance authority such as a government or other regulatory body (e.g., each state having legalized cannabis generally mandates that operators in the state use a specific third-party cannabis tracking system for tracking and reporting compliance information for each cannabis plant and its products "from seed to sale" such as third-party tracking systems like METRC™, BioTrack-THC™, etc.). It is conceivable that tracking authorities could be created from time to time such as for unregulated items, for currently unrelated items that become regulated, or for specific types of items, e.g., tracking of wine appellations, tracking patented strains of cannabis or other patented items, tracking items from specific stocks, etc. A "successful" completion event and an "unsuccessful" completion event can be defined for any given lifecycle item. For example, a successful completion event for a plant might be defined as a successful harvest of a plant (where success could be measured, for example, by the plant reaching harvest or producing a specific amount of marketable product or producing a specific amount of revenue, etc.) whereas an unsuccessful completion event for a plant might be defined by other dispositions such as death or destruction of the plant or otherwise failing to reach the predefined successful completion event. It should be noted that a lifecycle item can include any item or group of items (e.g., a batch of plants) that can be tracked using an identifier.

As used herein, a "tag" is a device that can be affixed to or otherwise associated with a lifecycle item and that carries a unique identifier (e.g., an RFID, bar code, QR code, etc.) that generally can be read by a scanner (e.g., an RFID reader, a bar code or QR code scanner, a camera of a smartphone or tablet computer, etc.) or physically input into the third-party tracking system. Embodiments are not limited to any particular tag, type of identifier, method of scanning, etc. Identifiers may be unique globally or within a given population of identifiers and may be unique either permanently or within a given time period (e.g., under certain circumstances, it is conceivable that identifiers may be recycled for use with subsequent lifecycle items).

As used herein, a "cryptographic digital asset" or "CDA" can be any type of cryptographic digital asset such as, for example, a coin, a token, a fungible token, or a non-fungible token (NFT). A CDA such as an NFT is a cryptographically signed representation of ownership rights relating to a unique asset or item and may, but does not necessarily, provide or convey any ownership or interest in the asset or item itself. An asset or item associated with a CDA may be physical or digital and may not itself exist within the cryptographic digital asset, e.g., in some cases, a CDA may store the asset or item itself (e.g., a digital asset or item such as a digital photograph, video, audio file, document, etc. could be stored in the CDA in its entirety), while in other cases, a CDA may store information about the asset or item such as a unique identifier, a photograph, and/or characteristics of the asset or item. A CDA generally includes a "smart contract" that encodes the terms of an agreement between the seller of a CDA and the buyer of the CDA such as, for example, the purchase price of the CDA, any rights in the asset or item that are conveyed to the buyer, any obligations undertaken by the seller, etc. The terms of the agreement may be fixed (e.g., by the seller) or may be negotiated between the seller and the buyer. The smart contract is generally created when the CDA is created or "minted". Smart contacts can be self-executing, e.g., based on information contained in the CDA as it is updated over time and/or based on external information that may be obtained from a blockchain, a database, or other source. A CDA including any associated smart contract is generally registered on a digital ledger (e.g., blockchain) to provide such things as a record of the purchase of the CDA, proof of ownership of the CDA, immutable evidence of the smart contract and its terms, etc. Embodiments are not limited to any particular type of CDA. For example, CDAs may be NFTs that specify the identifier of a lifecycle item (such as, the identifier indicated by the tag associated with the lifecycle item) as well as characteristics input by the operator. In various implementations, NFTs may be implemented by any number of standards, for example, ERC-721, ERC-998 or ERC-1155 on Ethereum; FA2 standard on Tezos; or Flow-NFT. The same applies to fungible tokens, which on Ethereum may be implemented by the standards ERC-20, ERC-998 or ERC-1155; FA1.2 standard on Tezos; or Flow-FT.

The present disclosure provides for a system (referred to herein as a "commodities fungible token" or "CFT" system) to provide a marketplace or exchange (e.g., via a dashboard or other interface) for operators to raise capital through the issuance of cryptographic digital assets (CDAs) corresponding to their lifecycle items and for users to participate financially in the marketplace by purchasing CDAs associated with lifecycle items. As used herein, an "operator" (sometimes referred to as "seller") is generally the provider of a lifecycle item for which a CDA is offered through the marketplace (e.g., a grower, producer, manufacturer, etc.) and a "user" (sometimes referred to as "buyer") is generally the purchaser of a CDA associated with a lifecycle item. It should be noted that a particular person may be both an operator for offering CDAs for sale and a user for purchasing CDAs from other operators.

In certain embodiments, the CDA associated with a lifecycle item is specially configured to provide no ownership or other interest in the operator, the operator's assets (e.g., business or operation, house, vehicle, bank account, etc.), the lifecycle item, or any product of the lifecycle item, and also is configured to provide no obligation for the operator to use funds received from the sale of the CDA for any particular purpose. Thus, for example, the operator would not be obligated to use the funds for the specific lifecycle item (e.g., the operator would not be obligated to use the funds for a specific plant associated with the CDA) or for other lifecycle items (e.g., the operator would not be obligated to use the funds for growing other plants) or even for the operator's business or operation (e.g., the operator could use the funds for any purpose, even a purpose having nothing to do with growing plants). Instead, in some embodiments, the CDA defines a redemption value that the buyer will receive upon a predetermined successful completion event associated with the lifecycle item (e.g., the sale price plus interest). The redemption value can be monetary (e.g., the sale price plus interest) or non-monetary (e.g., a physical or digital asset or item). Embodiments are not limited to any particular type of redemption value or manner in which the redemption value is provided to the buyer (e.g., funds transfer from seller to buyer, purchasing back the CDA from the buyer, etc.). In certain embodiments, the buyer will receive nothing if the predetermined successful completion event does not come to fruition. Due in part to this decoupling of the CDA from the lifecycle item itself, in certain embodiments, the sale price and/or redemption value of the CDA generally has no direct correlation to the value of the lifecycle item but rather could, for example, be based solely on an amount of funding sought by the operator/seller and/or the amount of risk that is acceptable to the user/buyer. Also, it is conceivable that multiple CDAs could be created and sold for a single lifecycle item, with different CDAs potentially having different sale prices and/or redemption values and/or predefined successful completion events, as the payouts of the redemption values are not tied to the value of the lifecycle item itself but instead are based on the lifecycle item reaching successful completion (e.g., each CDA buyer is essentially investing for successful completion of the lifecycle item per the definition of successful completion in their CDA). In other embodiments, the user/buyer may provide an ownership or other interest in the operator or lifecycle item, in which case the sale price and/or redemption value of the CDA is more likely to relate to the value of the lifecycle item or its products.

Thus, in certain embodiments, the purchase of a CDA associated with a lifecycle item has aspects of an unsecured personal gift or loan to the operator in that the buyer has no recourse against the operator's assets, or against the lifecycle item, or against any product of the lifecycle item, if, for example, the predetermined successful completion event never comes to fruition (e.g., if a plant associated with a CDA dies or is destroyed) or the predetermined successful completion event comes to fruition but the buyer does not receive the agreed-upon redemption value from the seller.

Certain embodiments address these types of risks by generating reputational information such as a reputation score and/or statistical information for the seller (e.g., based on system analytics such as the percentage of the seller's CDAs that reach successful completion with payout of the redemption value alone and/or relative to other sellers) that can be used by potential buyers to assess the seller and also could be used within the marketplace to set the sale price and/or redemption value for a CDA. For example, one grower might have a true "green thumb" such that a high percentage of plants reach successful completion but the seller "stiffs" buyers by refusing to pay out the redemption value, whereas another grower might be a novice such that a high percentage of plants fail to reach successful completion (which could change over time as the seller becomes a better grower) but the seller pays out the redemption value for all plants that reach successful completion. Such a distinction can affect the reputation scores of the sellers generated by the CFT system, e.g., a dishonest expert grower might have a lower reputation score than an honest novice-but-improving grower. In any case, a seller having a poor reputation might be forced to sell CDAs providing a higher rate of return (e.g., at a lower price or greater redemption value) than a seller of similar lifecycle items having a good reputation and therefore sellers generally have an incentive to take steps to improve their reputations. Additionally, or alternatively, the CFT system could suspend or ban a seller from the marketplace based on the reputational information.

Another risk is that the seller could report false information to the CFT system for some number of CDAs (e.g., reporting that the predetermined successful completion event did not come to fruition when in fact it had) even at the risk of lowering the seller's reputation score (e.g., the seller might deem it acceptable to "stiff" some number of buyers by reporting an unsuccessful competition event rather than reporting a successful completion event and refusing to pay). Certain embodiments address this risk by, among other things, leveraging information provided by the operator to a compliance authority (e.g., a government or other regulatory body) via a third-party tracking system that is generally mandated by the compliance authority for use by the operator. The information provided by the operator to the compliance authority is highly likely to be accurate due to requirement for strict compliance with applicable laws and regulations, and this information can be used to verify information in the CFT system (e.g., to determine or verify successful or unsuccessful completion) and/or to generate information in the CFT system (e.g., creating and/or updating a CDA based on information received directly or indirectly from the third-party tracking system). For example, the same unique identifier used by the operator to report information to the compliance authority via the third-party tracking system may be used for tracking the lifecycle item in the CFT system (e.g., creating the CDA using the same unique identifier), or an identifier used for the CDA in the CFT system may be correlated with the identifier used to report information to the compliance authority so that information reported to the compliance authority can be matched with the corresponding lifecycle item in the CFT system. The CFT system could obtain such information in any of various ways, such as, for example, the seller obtaining reports from a tracking system such as in paper form or in electronic form in a format such as CSV, PDF, XLS, etc. and providing the reports to the CFT system (note that the operator is generally deemed to own and is responsible for the validity of its data provided to the compliance authority via the third-party tracking system), the CFT system being given access to a tracking system such as through an approved API or other interface (which could be limited such as to specific operators or lifecycle item identifiers), or a tracking system being configured to send or "push" information to the CFT system (e.g., on a per-identifier basis such as when information for that identifier is added or changed in the third-party tracking system). The agreement between the operator and the CFT system allowing the operator to sell CDAs through the marketplace may require that the operator provide reports (e.g., on a predetermined schedule or at predetermined events) for use by the CFT system, as discussed below.

For purposes of describing various embodiments, reference is now made to FIG. 1A, which is a functional block diagram of an example CFT system 100. Among other things, this CFT system 100 includes a CFT application 150 that provides the above-mentioned marketplace. The CFT application 150 can store information in a CFT database 180 and/or in a digital public ledger 170. Certain information may be provided by the operator to a compliance authority such as a government or other regulatory body via a third-party tracking system 190, e.g., independently of the CFT application 150 but potentially leveraged by the CFT application 150 as mentioned above. For example, the operator may be obligated to employ a specific third-party tracking system 190 through which information is provided to the compliance authority 140 in accordance with regulations. The operator generally includes an operator tracking system 130 that, among other things, receives and stores information relating to various operator lifecycle items (e.g., on an ongoing basis from various operator personnel and systems) and provides information to the third-party tracking system 190 (e.g., monthly) to be conveyed to the compliance authority 140 in a predetermined format such as required for compliance auditing by the compliance authority 140. The operator tracking system 130 may include a client component of the third-party tracking system (e.g., allowing for secure communications and interoperation between the operator tracking system 130 and the third-party tracking system 190), but, in any case, the data stored by the operator tracking system is generally deemed to be owned by the operator and therefore the owner has access to the information being provided to the compliance authority 140. The CFT system 100 also includes an operator device 109, such as a mobile phone, tablet, laptop, computing device, etc., that is in communication with the CFT application 150 via the distributed communications network 160, and through which an operator can access the CFT application 150. The CFT system 100 also includes a user device 115, such as a mobile phone, tablet, laptop, computing device, etc., that is in communication with the CFT application 150 via the distributed communications network 160, and through which a user can access the CFT application 150.

The CFT application 150 is an application layer of the CFT system 100 and may include a CFT application server component (e.g., cloud-based) that can provide an interface through which the operator (via the operator device 109) interacts with the CFT application 150 (e.g., a web-based interface and/or an app-based interface working in conjunction with a CFT mobile application component that is downloaded onto the operator device 109) and an interface through which the user (via the user device 115) interacts with the CFT application 150 (e.g., a web-based interface and/or an app-based interface working in conjunction with a CFT mobile application component that is downloaded onto the user device 115). The CFT mobile application component that runs on the user device 115 may be different than the CFT mobile application components that runs on the operator device 109 (e.g., separate software programs or "apps") or may be the same as the CFT mobile application component that runs on the operator device 109 (e.g., a common software program or "app" supporting both user and operator interface functionality, which, for example, could allow a particular person to use the CFT mobile application component as both an operator for offering CDAs for sale and a user for purchasing CDAs from other operators).

The CFT system may include an item scanner 152 for scanning tags associated with lifecycle items (which additionally or alternatively may be done using the operator device 109 in some embodiments).

Figure 1B:
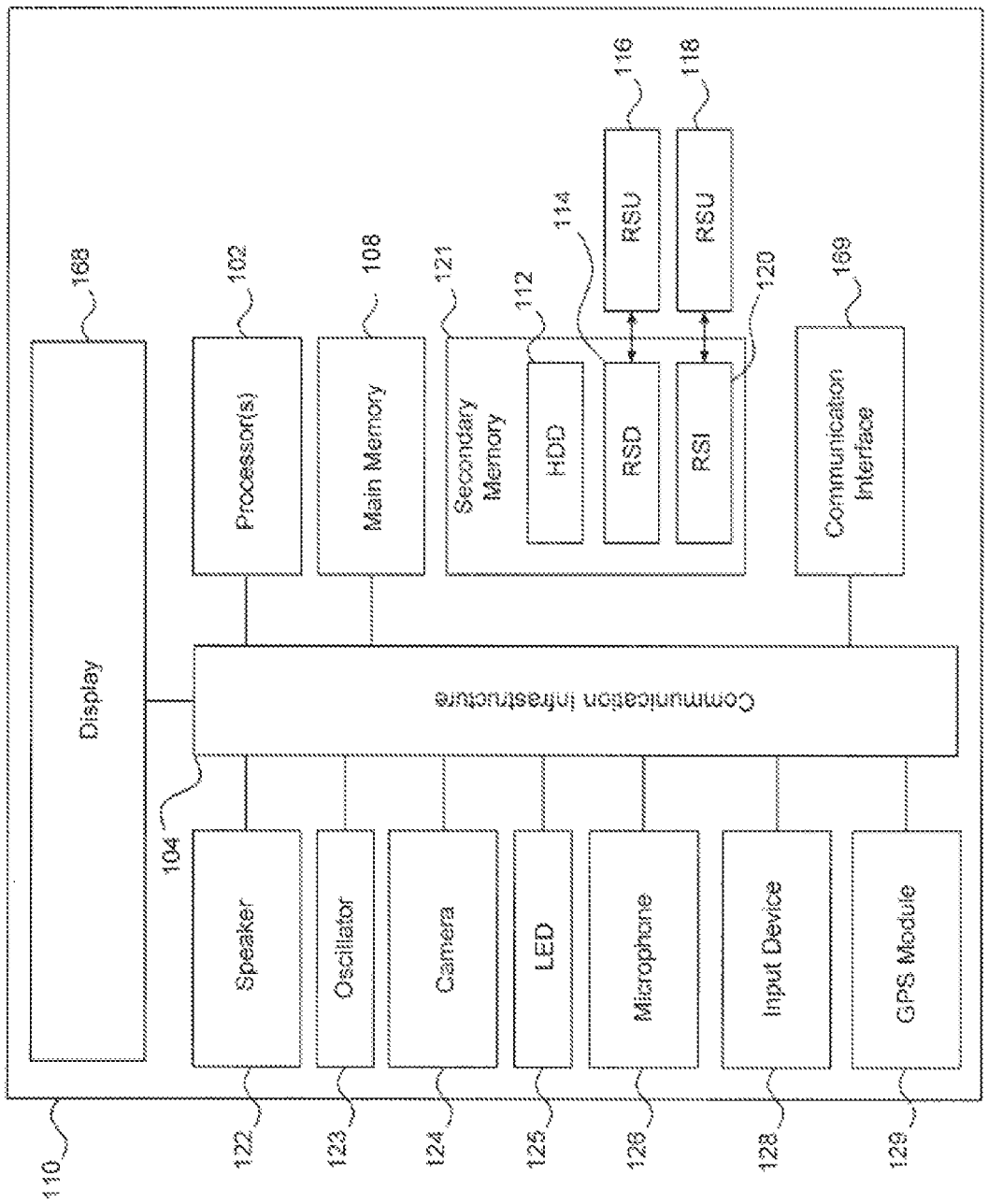
FIG. 1B illustrates an example of an architecture of devices, in accordance with some embodiments of the present disclosure.

FIG. 1B is a block diagram of one example of an architecture of a device 110 such as the operator device 109, the user device 115, or the item scanner 152. As shown in FIG. 1B, the device 110 may include one or more processors, such as processor(s) 102. Processor(s) 102 may be any central processing unit (CPU), microprocessor, micro-controller, or computational device or circuit for executing instructions. Processor(s) are connected to a communication infrastructure 104 (e.g., a communications bus, cross-over bar, or network).

As shown in FIG. 1B, the device also may include a display 168 that displays graphics, video, text, and other data received from the communication infrastructure 104 (or from a frame buffer not shown) to a user (e.g., a subscriber, commercial user, back-end user, or other user). Examples of such displays 168 include, but are not limited to, LCD screens, OLED display, capacitive touch screen, and a plasma display, to list only a few possible displays.

The device 110 also may include a main memory 108, such as a random access (RAM) memory, and may also include a secondary memory 121. Secondary memory 121 may include a more persistent memory such as, for example, a hard disk drive (HDD) 112 and/or removable storage drive (RSD) 114, representing a magnetic tape drive, an optical disk drive, solid state drive (SSD), or the like. In some embodiments, removable storage drive 114 reads from and/or writes to a removable storage unit (RSU) 116 in a manner that is understood by one of ordinary skill in the art. Removable storage unit 116 represents a magnetic tape, optical disk, or the like, which may be read by and written to by removable storage drive 114. As will be understood by one of ordinary skill in the art, the removable storage unit 116 may include a tangible and non-transient machine-readable storage medium having stored therein computer software and/or data.

In some embodiments, secondary memory 121 may include other devices for allowing computer programs or other instructions to be loaded into the device 110. Such devices may include, for example, a removable storage unit (RSU) 118 and a corresponding interface (RSI) 120. Examples of such units 118 and interfaces 120 may include a removable memory chip (such as an erasable programmable read only memory (EPROM)), programmable read only memory (PROM)), secure digital (SD) card and associated socket, and other removable storage units 118 and interfaces 120, which allow software and data to be transferred from the removable storage unit 118 to the device.

The device 110 also may include one or more of the following: a speaker 122, an oscillator 123, a camera 124, a light emitting diode ("LED") 125, a microphone 126, an input device 128, an accelerometer (not shown), a global positioning system ("GPS") module 129, or a combination thereof.

Examples of input device 128 include, but are not limited to, a keyboard, buttons, a trackball, or any other interface or device through which a user may input data. In some embodiment, input device 128 and display 168 are integrated into the same device. For example, display 168 and input device 128 may be touchscreen through which a user uses a finger, pen, and/or stylus to input data into the device 110.

The device 110 also includes one or more communication interfaces 169, which allows software and data to be transferred between the device 110 and external devices such as, for example, another similar device 110, or a computer that may be locally or remotely connected such as via Wi-Fi or Internet. Examples of the one or more communication interfaces 169 may include, but are not limited to, a modem, a network interface (such as an Ethernet card or wireless card), a communications port, a Personal Computer Memory Card International Association (PCMCIA) slot and card, one or more Personal Component Interconnect (PCI) Express slot and cards, or any combination thereof. The one or more communication interfaces 169 may also include a wireless interface configured for short range communication, such as near field communication (NFC), Bluetooth, or other interface for communication via another wireless communication protocol.

Software and data transferred via the one or more communications interfaces 169 are in the form of signals, which may be electronic, electromagnetic, optical, or other signals capable of being received by communications interfaces 169. These signals are provided to communications interface 169 via a communications path or channel. The channel may be implemented using wire or cable, fiber optics, a telephone line, a cellular link, a radio frequency (RF) link, or other communication channels.

In this present disclosure, the terms "non-transitory computer program medium" and "non-transitory computer readable medium" refer to tangible media such as removable storage units 116, 118, or a hard disk installed in hard disk drive 112. These computer program products can be used to provide software to the device 110. Computer programs (also referred to as "computer control logic") may be stored in main memory 108 and/or secondary memory 121. Computer programs may also be received via the one or more communications interfaces 169. Such computer programs, when executed by a processor(s) 102, enable the device 110 to perform the features of the methods and systems discussed herein.

The CFT application 150 may store a set of operator accounts, including operator identifiers, such as name token strings, as well as a wallet of the operator. The operator provides the identifier associated with a lifecycle item to the CFT application 150 for such things as creating a CDA to be offered for sale through the marketplace and for providing updated information about the lifecycle item to the CFT application 150 (e.g., information from which the CFT application 150 can determine a successful completion event or an unsuccessful completion event, and optionally intermediate information such as lifecycle progress and status information that could be of interest to users/buyers). The operator can provide the identifier to the CFT application 150 in any way, although embodiments typically use a scanning device to scan a tag 151 associated with the lifecycle item to obtain the identifier and send the identifier to the CFT application 150 (the identifier could be provided in other ways, e.g., entered manually or transmitted to the CFT application 150). The CFT application 150 generally receives the identifier from a scanning device such as, for example, the operator device 109 (which, for example, may scan the tag 151 using a built-in camera or using wireless RF communication or may receive the identifier from an item scanner 152 that is in communication with the operator device 109 through a communication connection that could include the distributed communications network 160) or directly from the item scanner 152 (e.g., over the distributed communications network 160). Thus, for example, the item scanner 152 may be considered optional in some embodiments. The item scanner 152 may be a mobile device with RFID or other reading/scanning capabilities. The item scanner 152 may be operably coupled to the operator device 109 for the two devices to operate together. Thus, the item scanner 152 and the operator device 109 (alone or together) may be considered operator input devices through which information can be provided by the operator to the CFT application 150. The operator also may be able to provide information to the CFT application 150 through a web-based interface without using the item scanner 152 or operator device 109. Thus, the web-based interface may be considered an operator input device. Other types of operator input devices can be supported in various embodiments.

The operator device 109 and/or the item scanner 152 may include a display and user input capabilities and may obtain any existing information regarding the read identifier from various sources such as a digital public ledger 170 or a CFT database 180. Further, the operator device 109 and/or the item scanner 152 may prompt the operator with a plurality of fields related to lifecycle item characteristics, through the CFT application previously mentioned. The operator can fill out the plurality of fields by entering user input (such as item details, offered sale price, offered redemption value, etc.) and, if the operator device 109 and/or the item scanner 152 includes a camera, the operator can upload a photo of the lifecycle item. Again, information from the item scanner 152 can be conveyed to the CFT application 150 through the operator device 109 or directly through the distributed communications network 160.

Additionally, or alternatively, lifecycle item information may be provided to the CFT application 150 from the operator tracking system 130, e.g., reports in paper form (in which case the CFT application 150 may need to scan and convert the paper reports for electronic processing), reports in electronic form, through an API, etc. One potential advantage of receiving lifecycle item information from the operator tracking system 130 is that the operator is already providing the information to the operator tracking system 130 and therefore would not need to perform additional steps to provide lifecycle item information to the CFT application 150, e.g., scanning tags, entering descriptive information, etc. Another potential advantage is eliminating the change of human error causing a discrepancy between the information provided to the operator tracking system 130 and the information provided to the CFT application 150.

In various implementation, when the CFT application 150 receives an identifier (e.g., from the tag 151) corresponding to a new lifecycle item that is not already associated with an CDA, the CFT application 150 can prompt the operator, e.g., via a display of the item scanner 152 or the operator device 109, whether to create a CDA for the corresponding identifier. Such prompting could include characteristic fields for the operator to input information about the lifecycle item to the CFT application 150, such as, for example, location, height, appearance, soil type, plant or cannabinoid type, etc. Some information may be provided automatically. For example, the CFT mobile application component operating on the operator device 109 may leverage GPS capabilities of the operator device 109 to automatically input a location of the lifecycle item. Similarly, information such as date and time may be obtained automatically from the operator device 109. The operator may be able to include a photograph or drawing of the lifecycle item, e.g., using an in-built camera of the operator device or item scanner 152 to upload a photograph. Additionally, or alternatively, the CFT application 150 could receive identifiers and/or characteristic information from the operator tracking system 130.

For example, an operator, such as a commercially licensed cannabis grower, can affix a tag such as an RFID tag having a unique identifier (e.g., in the form of a numeric or alphanumeric identifier) to a lifecycle item such as a plan and can scan the RFID tag to obtain the unique identifier. Then, through the CFT system 100, the operator can provide information relating to the lifecycle item, such as, for example, a photo or drawing of the lifecycle item and a plurality of characteristics defining the particular lifecycle item, such as, for example, description, location, height, appearance, soil type, plant or cannabinoid type, etc.

The plurality of characteristics of each lifecycle item may be stored as metadata associated with the particular identifier and logged in a blockchain or a digital public ledger, such as Ethereum, which may be compatible with other blockchains that a user can transfer assets between, such as Layer2

(Loopring, Starkware, Matter, etc.) or Sidechain (Polygon, xDai). However, in various implementations, while metadata may be stored on-chain, a plurality of metadata, for example, larger data, such as photos, etc., may be stored off-chain in a CFT database. This additional, larger, data, usually stored off-chain, also describes the item to which the CDA represents. While formal metadata standards for CDAs do not exist, there are several guidelines that have gained popularity and ensure interoperability. Metadata need not be static, that is it can change as often as necessary, and be read via the CDA at any time. Metadata can be stored on-chain, within the CDA itself, by extending the token standard to include additional attributes and functionality, but this increases storage and compute costs drastically.

Therefore, data describing the lifecycle item also may be stored in the CFT database 180 and indexed by unique IDs created when the NFT is minted (or by the identifier of the RFID tag). On-chain or off-chain, this data will need to be updated as the throughout the lifecycle of the plants. Since this data may not be immutable, it may be necessary to store a "hash" of off-chain metadata at a certain increments on-chain, within the NFT, so the history of metadata changes can be verified (like status moving from stage to stage). Media, like images, is most likely also stored off-chain and accessible through links in the metadata, so the notion of a "verifiable history" may become important as images change.

Thus, the characteristics describing each lifecycle item may be stored on-chain on the digital public ledger 170 and/or off-chain on a CFT database 180. For example, any characteristics or data that is too large may be associated with the identifier of the tag 151 of the lifecycle item and stored in the CFT database 180. Then, when the tag 151 is scanned, data may be obtained from the digital public ledger 170 and/or the CFT database 180. The CFT database 180 may be a plurality of databases or servers operated and owned by a single entity or a plurality of entities.

Figure 2:
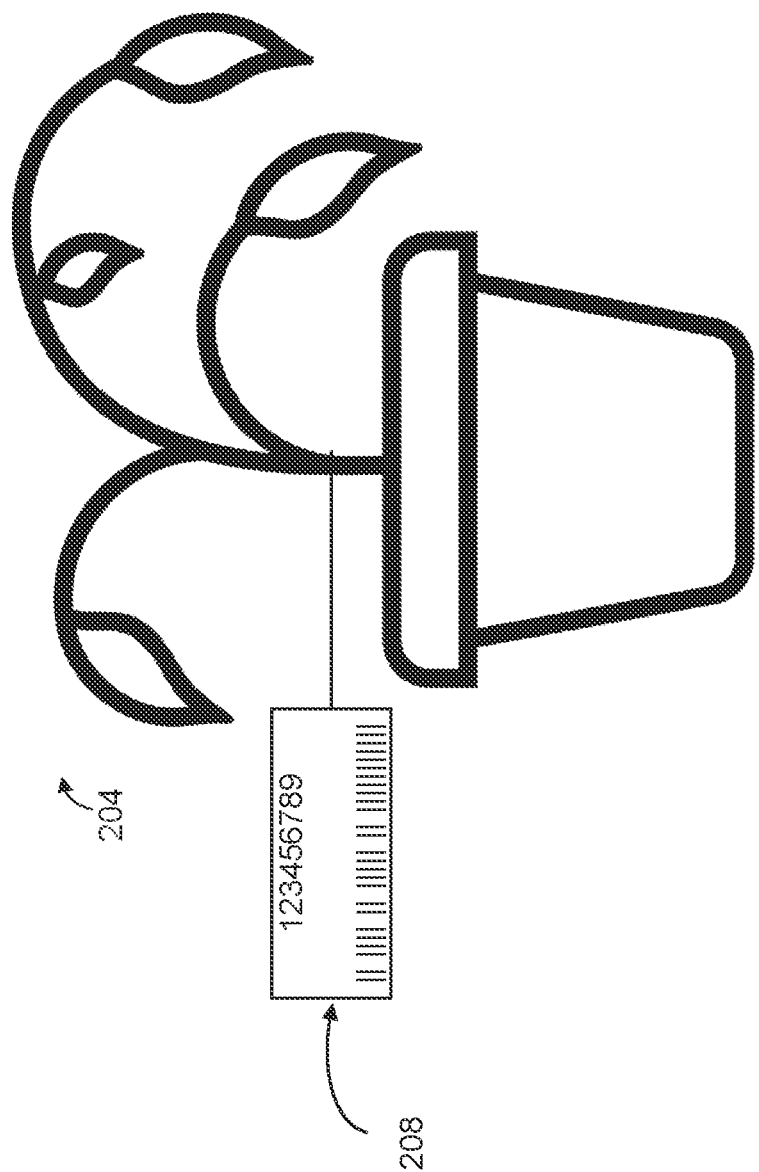
FIG. 2 is an illustration depicting a plant with a RFID tag representing a digital asset, in accordance with some embodiments of the present disclosure.

FIG. 2 is an illustration depicting a plant with a tag representing a digital asset, in accordance with some embodiments of the present disclosure. As shown, a plant image 204 is shown with a tag 208, for example, an RFID tag, that is affixed to or otherwise associated with the plant. An image of the plant image 204 may be uploaded on-chain or off-chain to use to characterize the depicted plant.

FIGS. 3A and 3B are illustrations depicting creation of art to be used to mint a CDA such as an NFT for sale on a CFT system, in accordance with some embodiments of the present disclosure. For example, FIG. 3A shows an operator capturing a first image of a plant 304 using a camera. Then, FIG. 3B, is an image of an operator drawing an image of the plant. In some implementations, the image of the plant can be the image of one or more plants.

When ready, the CDA can be created using the unique identifier and characteristic information and offered for sale through the marketplace. In various implementations, a CDA for a lifecycle item may be offered for sale "pre-mint," which is a function of the CFT application 150 that allows a CDA to be listed but not minted until after any negotiations between the operator and the user are completed (e.g., to set the sale price and redemption value) and the CDA is sold. This allows for "creation" and listing of the CDA without spending capital up-front. That is, the minting cost can be paid when the CDA is purchased, e.g., by the operator or by the user. Alternatively, the CDA can be minted, e.g., including a smart contract, with information that can be updated over time such as to reflect a negotiated agreement between the operator and the user. In any case, the CDA is generally logged into a digital public ledger to record the existence of the lifecycle item and for updating characteristics about the lifecycle item at various times throughout its lifecycle. A user of the CFT system may purchase one or more CDAs corresponding to particular lifecycle items and, through the CDAs, can track such things as growth, size, health, timestamp, etc. throughout the lifecycle of the item and can receive the agreed-upon redemption value upon a successful completion event. The CDA may be purchased and exchanged between users at any point during the lifecycle of the lifecycle item, e.g., a first buyer may sell to a second buyer, etc.

As mentioned above, a user may interact with the CFT application 150 via the user device 115, such as to see a display list of CDAs available for purchase or trade, view a CDA bond yield curve based on age size, health, etc., view their wallet, execute purchases or trades, transfer Fiat currency to their wallet, etc. The CFT application 150 may store a set of user accounts, including user identifiers, such as name token strings, as well as a wallet of the user. A user's wallet included in the CFT application 150 is a user-friendly way of managing one's public and private key-pair, interact with the digital public ledger 170, sign transactions, and view held crypto-related assets. For example, a public key or address is a public-facing "account number" (i.e., wallet) that holds many different types of crypto-related assets, including tokens, tickets, CDAs, etc., which may be purchased using Fiat currency. A user's private key is a secret and cryptographically grants access to signing functions of a public key in order to interact with the digital public ledger 170 (blockchain) at large.

Figure 4:
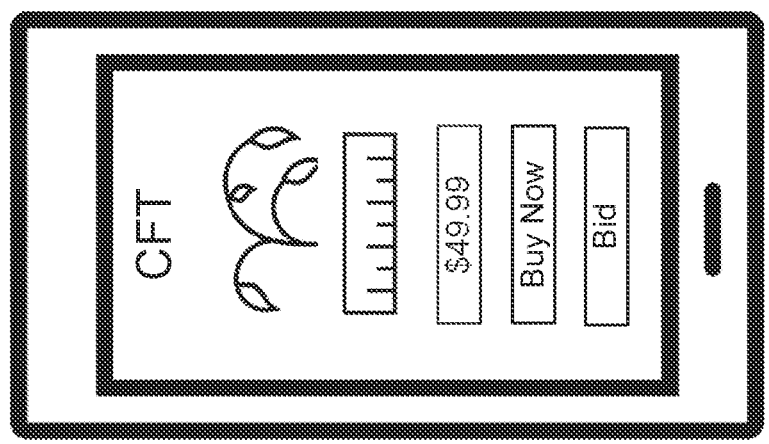
FIG. 4 is an illustration of a user purchasing and/or exchanging a digital asset on a user device via a CFT system, in accordance with some embodiments of the present disclosure.
Figure 4:
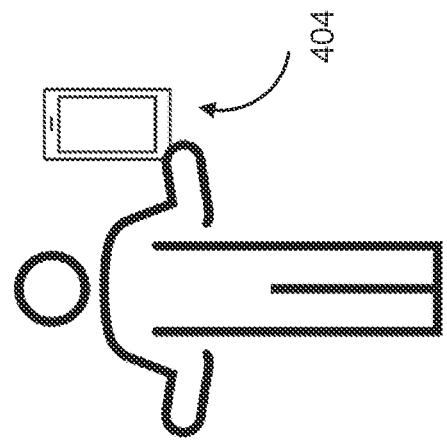

FIG. 4 is an illustration of a user purchasing and/or exchanging a digital asset on a user device 115 via a CFT system 100, in accordance with some embodiments of the present disclosure. For example, a user is operating a user device including a graphical user interface 404 provided by the "app" running on the user device allowing the user to view a CDA (which may be associated with a plant as shown in the picture), and in this example the user may select a "buy now" button" to purchase the CDA (e.g., with terms set by the operator) or a "bid" button to attempt to procure the CDA.

Figure 5B:
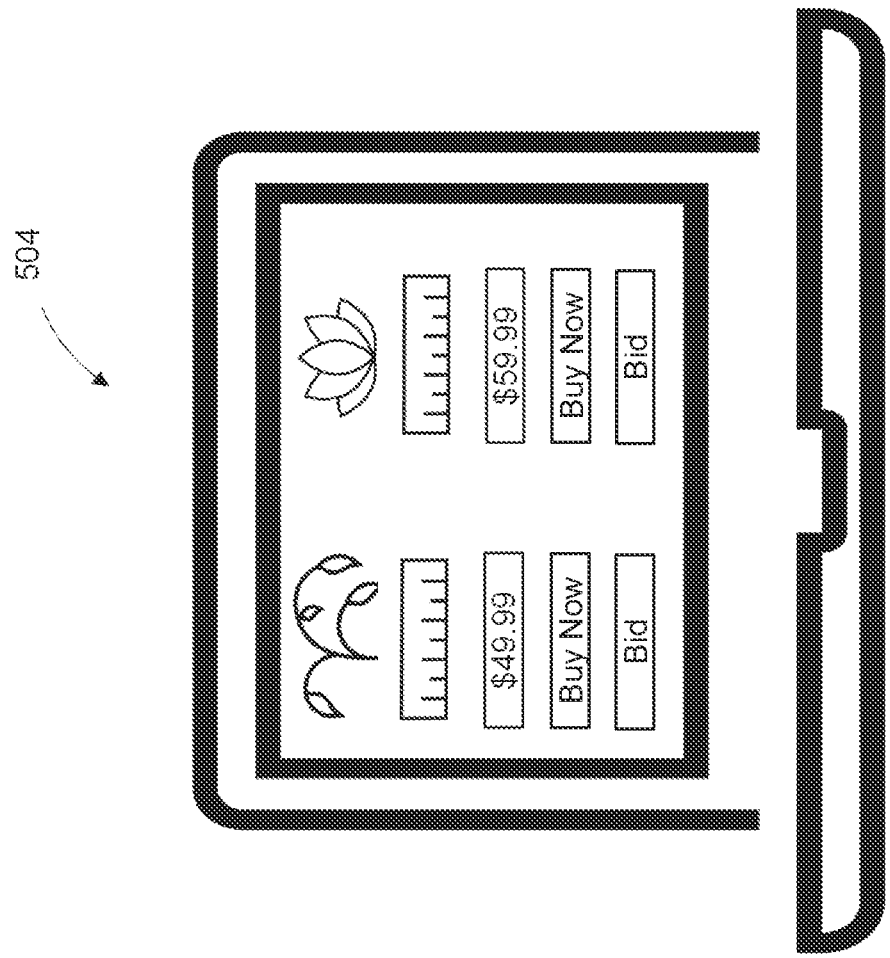
FIGS. 5A and 5B are illustrations of user interfaces of a CFT application on user devices, in accordance with some embodiments of the present disclosure.
Figure 5A:
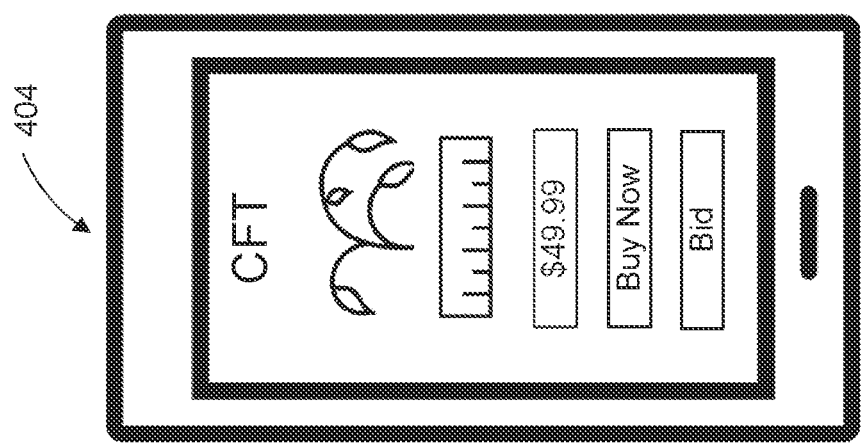

FIGS. 5A and 5B are illustrations of user interfaces of a CFT application on user devices, in accordance with some embodiments of the present disclosure. For example, FIG. 5A depicts the graphical user interface 404 of FIG. 4, offering to a user to buy or bid on a CDA associated with a plant. FIG. 5B depicts a graphical user interface 504 of another type of user device, a laptop, listing multiple different CDAs available on the CFT application for purchase.

In some embodiments, the CFT application 150 may allow the operator and the user to negotiate terms of the sale of a CDA, such as, for example, the sale price and/or the redemption value. For example, the "app" running on the operator device 109 and the "app" running on the user device 115 may include interface screens or fields allowing for such negotiation via the CFT application 150. For example, as shown in FIGS. 4, 5A, and 5B, the user may be able to bid on a CDA, in which case the CFT application 150 may notify the operator of the bid and may provide the operator with the ability to accept the bid or provide a counteroffer. As the progress of the lifecycle item (e.g., health, growth, and yield of each lifecycle item such as a cannabis plant) is generally not guaranteed, there is a risk versus reward for each user purchasing CDAs corresponding to lifecycle items such as plants. Users may be able to purchase or dispose of (e.g., resell or exchange) a CDA corresponding to a lifecycle item at any time during the item's lifecycle, generally with the effective return (e.g., the sale price and/or redemption value) reflecting the probability of the lifecycle item reaching successful completion. For example, a CDA associated with a cannabis plant might be sold with a higher effective return during the seedling stage compared to the flowering stage to reflect the larger risk taken by the user at the seedling stage. In various implementations, a bond yield curve for CDAs corresponding to lifecycle items may be available via the CFT system or application to provide a fair value of the plants based on the characteristics uploaded to the digital public ledger, including age, size, location, etc., so that users may fairly evaluate such things as the present value of the corresponding CDA and likelihood that the CDA will yield the redemption value. Additionally, or alternatively, terms might be based at least in part on reputational information of the operator, e.g., sold with a higher effective return if the operator has a poor reputation to reflect the additional risk being taken by the buyer. In some cases, the CFT application 150 may set terms such as initially offered sale price and redemption value, e.g., based on reputational information of the operator, terms of similar lifecycle items in the marketplace, etc.

Thus, during the process of selling the CDA, the CFT application 150 may receive a purchase request for the CDA from the user via the user device (e.g., in the form of a "buy now" or "bid" operation), present the purchase request to the operator, optionally act as an intermediary for a negotiation between the operator and the user, and receive an indication of acceptance of the purchase request by the operator.

After the terms of the agreement are agreed-upon by the parties, notification can be provided to the CFT application 150 of the purchase operation (e.g., upon the user operating the "buy now" option, upon the operator accepting a bid from the user, upon the user accepting a counteroffer from the operator, etc.). In response to the purchase operation, the CFT application 150 can create or update a smart contract associated with the CDA and update information for the CDA on the blockchain to memorialize and provide proof of the purchase and terms.

Thereafter, from time to time, the CFT application 150 may receive updated information for the CDA (e.g., status information about the lifecycle item) such as from the operator (e.g., via the operator device 109) and/or the operator tracking system 130. The CFT application 150 can use this information to update information for the CDA on the blockchain to memorialize and provide proof of the status of the lifecycle item. Also, the CFT application 150 can use this information to determine if a completion event associated with the lifecycle item has occurred (e.g., representing a final disposition of the lifecycle item with respect to the CDA), and, if so, to determine if the completion event was a successful completion event or an unsuccessful completion event. In some embodiments as described above, because such information about the lifecycle item is provided to a compliance authority, the final disposition including whether a completion event was a successful completion event or an unsuccessful completion event is verifiable using information provided to the compliance authority, which, among other things, can reduce the risk to the user that the final disposition reported to the CFT application 150 is erroneous.

Similarly, from time to time, the user may access the CFT application 150 to obtain status information about the lifecycle item. In response to such access by the user, the CFT application 150 may obtain information about the lifecycle item from the digital public ledger 170 and/or from the CFT database 180 and provide information to the user, e.g., via the "app" running on the user device 115.

Upon determining that a completion event associated with the lifecycle item has occurred (e.g., a plant reaching maturity, dying, or being destroyed), the CFT application 150 may determine if the completion event was a successful completion event or an unsuccessful completion event in accordance with the smart contract associated with the CDA. If the completion event was a successful completion event, the CFT application 150 may facilitate or effectuate transfer of the redemption value from the operator to the user, e.g., by automatically initiating a transfer of funds from an operator account to a user account to provide the redemption value to the user. Alternatively, the operator and the user may effectuate transfer of the redemption value from the operator to the user, in which case the operator and/or the user may provide confirmation of transaction completion (or alternatively an indication of non-completion) to the CFT application 150, e.g., using the "app" running on the device.

Figure 6:
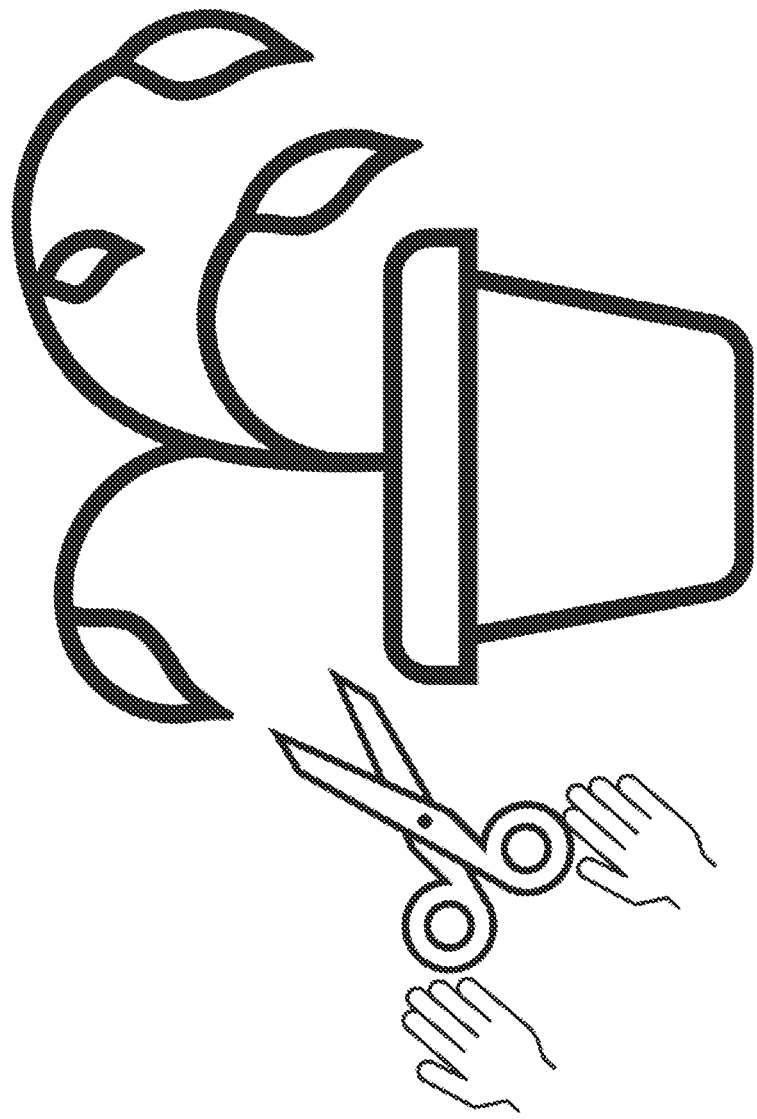
FIG. 6 is an illustration of harvesting of a plant, in accordance with some embodiments of the present disclosure.

FIG. 6 is an illustration of harvesting of a plant for movement to the drying process at which time the RFID tag generally is removed from the plant and reported by the operator to the compliance authority (e.g., which may represent a successful completion event). For example, once harvested, the user may be notified via the CFT application and the redemption value may be distributed from an operator account to a user account via the CFT application.

Thus, for example, in various implementations, the CFT application 150 could be connected to Automated Clearing House (ACH) and/or other networks for transferring Fiat currency or funds from existing accounts to purchase CDAs through the CFT application, e.g., the CFT application 150 can transfer Fiat currency or funds from a user account to an operator account for the purchase of a CDA (perhaps taking a commission or fee for the sale). Further, the CFT application 150 can facilitate the distribution of the redemption value of a CDA, e.g., the CFT application 150 can transfer Fiat currency or funds from an operator account to a user account. For example, at the time of harvesting a plant (e.g., at the time the operator reports harvest to the third-party tracking system), the operator can use the operator device 109 to notify the CFT application 150 of successful completion, in which case the CFT application 150 may automatically initiate a transfer from an operator account to the user account for the agreed-upon redemption value associated with the CDA (e.g., using Fiat currency or a form of cryptocurrency) and may automatically update the blockchain to reflect successful completion.

As mentioned above, the CFT application 150 may generate reputational information such as a reputation score and/or statistical information for the operator (e.g., based on system analytics such as the percentage of the seller's CDAs that reach successful completion with payout of the redemption value alone and/or relative to other sellers) that can be used by potential buyers to assess the seller and also could be used within the marketplace to set the sale price and/or redemption value for a CDA. Thus, for example, the CFT application 150 may update the reputation score for the operator based on such things as the number of lifecycle items brought to completion by the operator, the number of successful vs. unsuccessful lifecycle item completions, and whether or not users received the redemption value from the operator. For example, the CFT application 150 may determine that the operator has an X % completion rate (e.g., 75%) with a Y % payout rate (e.g., 100%) for a total reputation score of Z (e.g., 90 out of 100). The CFT application 150 could suspend or block an operator from the marketplace based on poor performance, e.g., if the operator's reputation score is below a predetermined threshold.

While certain embodiments are described above with reference to CDAs in which the buyer receives no interest in the operator or lifecycle item and the seller is not obligated to use proceeds from the sale of the CDA for any particular purpose, it should be noted that the CFT application 150 could also handle CDAs in which buyers receive an interest in the operator or lifecycle item (e.g., the buyer of the CDA may receive some other compensation such as, for example, a percentage of profits from the lifecycle item such as based on fair market value at the time of a completion event such as harvest of a plant, or products of the lifecycle item such as a portion of a harvest of the lifecycle item) or in which the seller is obligated to use the funds for a particular purpose, in which case mis-use of the funds by the operator could be grounds for returning funds to the buyer and/or punishing the seller (e.g., lowering reputation score or suspending or blocking the operator from the marketplace).

The CFT system may solve a series of problems in regulated industries (e.g., the cannabis industry) by leveraging the technology underpinning the CDA structure. Implementing the CFT system as a monitoring and exchange marketplace by leveraging CDA structure may allow operators in regulated industries (e.g., cannabis growers) to generate cash flow without putting themselves, their assets, their companies, their plants, and their plant products at risk of liens or foreclosures and also may allow users such as individuals to make investments without taking any real interest in the operators specifically or even the regulated industry in general.

For example, the cannabis industry is highly regulated as evidenced by state and local governments requiring cannabis-related companies to track each cannabis plant from seed-to-sale. The CFT system can improve the tracking of the plants while incorporating a platform for generating revenue based on the existence of the plants. As present regulations may require operators to use RFID technology to track seed-to-sales, the CFT system can incorporate RFID technology to not only track the progress of plants, but also using the already tracked information to mint the obtained RFID data into CDAs for sale on the marketplace via the digital public ledger. Further, as RFID technology allows for accurate real-time inventory analysis, location tracking, and full transparency, the user that purchases a CDA can be consistently updated regarding the status of the corresponding plant such as to allow the user to evaluate whether the plant will or has attained the predetermined successful completion for which the user will receive the agreed-upon redemption value or to estimate the potential and eventual fair market value of the plant from which the user will receive royalties or proceeds upon the eventual sale.

Figure 7:
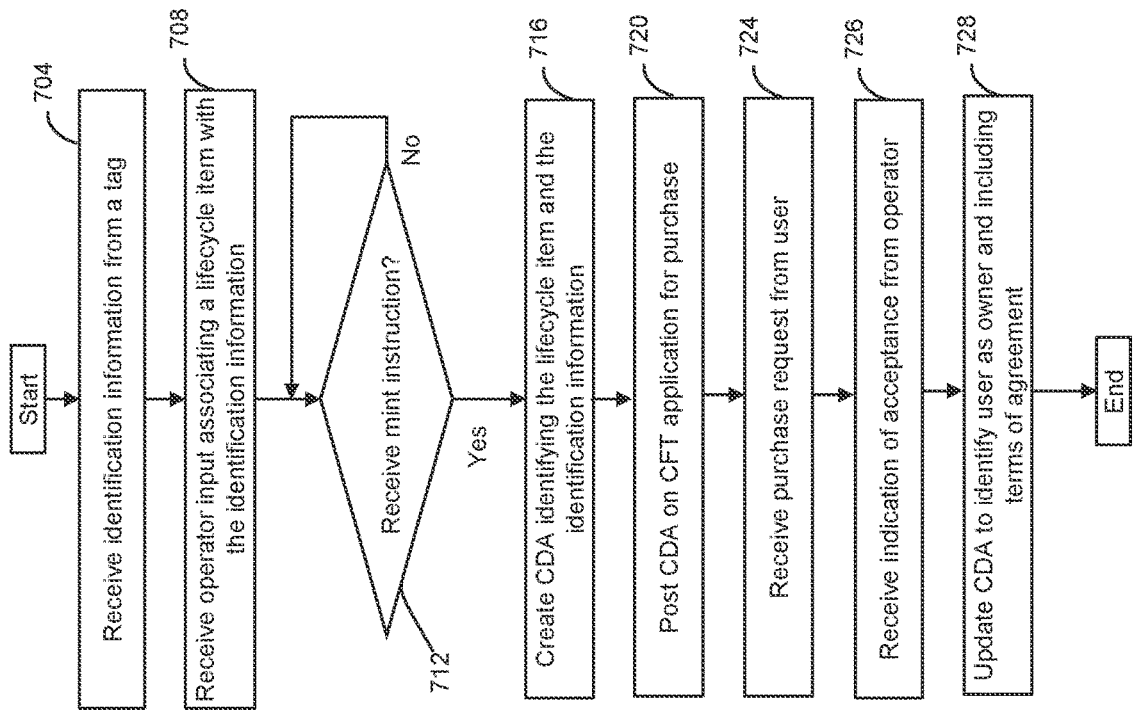
FIG. 7 is a flowchart depicting generating a cryptographic digital asset (such as a fungible token or NFT) associated with an item for sale on a CFT system, in accordance with some embodiments of the present disclosure.

FIG. 7 is a flowchart depicting generating a CDA such as an NFT associated with an item for sale on a CFT system, in accordance with some embodiments of the present disclosure. Control begins at 704 to receive identification information for a tag. For example, an identifier of the lifecycle item associated with the tag may have been obtained by scanning by the item scanner 152 or the operator device 109. Control continues to 708 to receive operator input associating a first item with the identification information obtained from the tag. At 712, control determines if an instruction is received to create a CDA, e.g., in response to prompting the operator to indicate if a CDA should be created. For example, an operator may select a user interface element in the CFT application to create the CDA and have the CDA offered for sale via the marketplace. If no, control waits. If yes, control continues to 716 to create a CDA by creating smart contract the represents the operator and identifies the lifecycle item and the identification information obtained from the tag. In various implementations, the operator may further input characteristics of the lifecycle item based on fields displayed on the screen to the operator, such as a photo, appearance, health, etc., and other characteristics may auto-populate, such as a timestamp, a location (based on a GPS functionality of the operator device, etc.). Once the CDA is created at 716, control continues to 720 to post the CDA on the CFT application for purchase. As mentioned previously, a CDA alternatively may be pre-mint, meaning that the CDA can be listed but not minted until after any negotiations between the operator and the user are completed (e.g., to set the sale price and redemption value) and the CDA is sold. Control continues to 724 to receive a purchase request from the user, which, as discussed above, may follow a period of negotiation between the operator and the user. Control then continues to 726 to receive indication of acceptance from the operator. Control then continues to 728 to update the CDA to identify the user as the owner of the CDA and to include terms of the agreement, e.g., as part of a smart contract associated with the CDA. Then, control ends.

Figure 8:
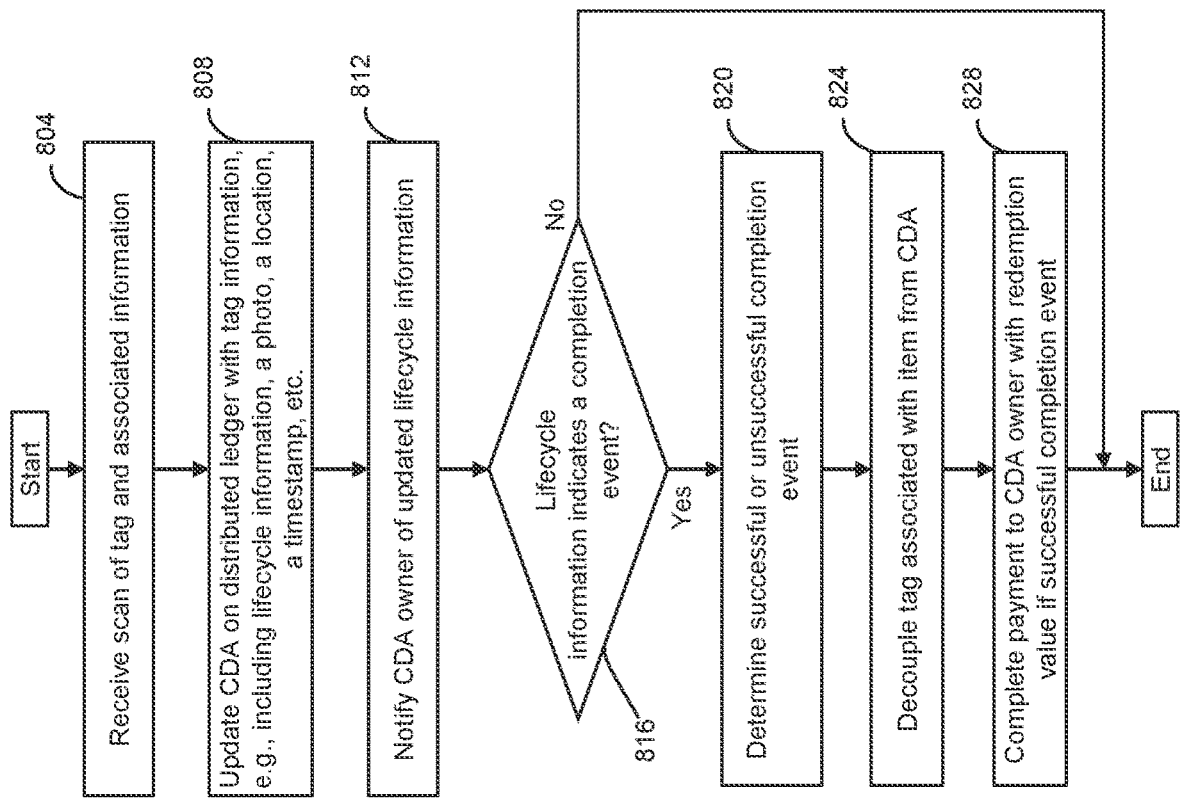
FIG. 8 is a flowchart depicting updating a cryptographic digital asset (such as a fungible token or NFT) on a CFT system based on a scan of a tag, in accordance with some embodiments of the present disclosure.

FIG. 8 is a flowchart depicting updating a CDA on a CFT system, in accordance with some embodiments of the present disclosure. Control begins at 804 to receive a scan of a tag along including associated information such as lifecycle information, a photograph of the lifecycle item, a location of the lifecycle item, a timestamp, etc. Control continues to 808 to update a corresponding CDA on the digital public ledger with the tag information (based on the received identifier of the tag that is also associated with the CDA). The CDA is updated (which could also be updated off-chain based on the tag identifier or the unique ID of the CDA) with information such as lifecycle information, a photo, a location, a timestamp, etc. Control continues to 812 to optionally notify the CDA owner of updated lifecycle information. In various implementations, such as when the CDA is not owned, step 812 may be skipped or optional. Control proceeds to 816 to determine if lifecycle information indicated that the corresponding item (e.g., plant) has been reached a completion event. If no, control ends. If yes, control continues to 820 to determine if the completion event represents a successful completion event or an unsuccessful completion event. Then, control continues to 824 to decouple the RFID tag associated with the item from the NFT (that is, decoupling the identifier of the RFID tag and the unique ID of the NFT). Control then proceeds to 828 to complete payment to CDA owner with the redemption value if the completion event was a successful completion event. Then, control ends.

Figure 9:
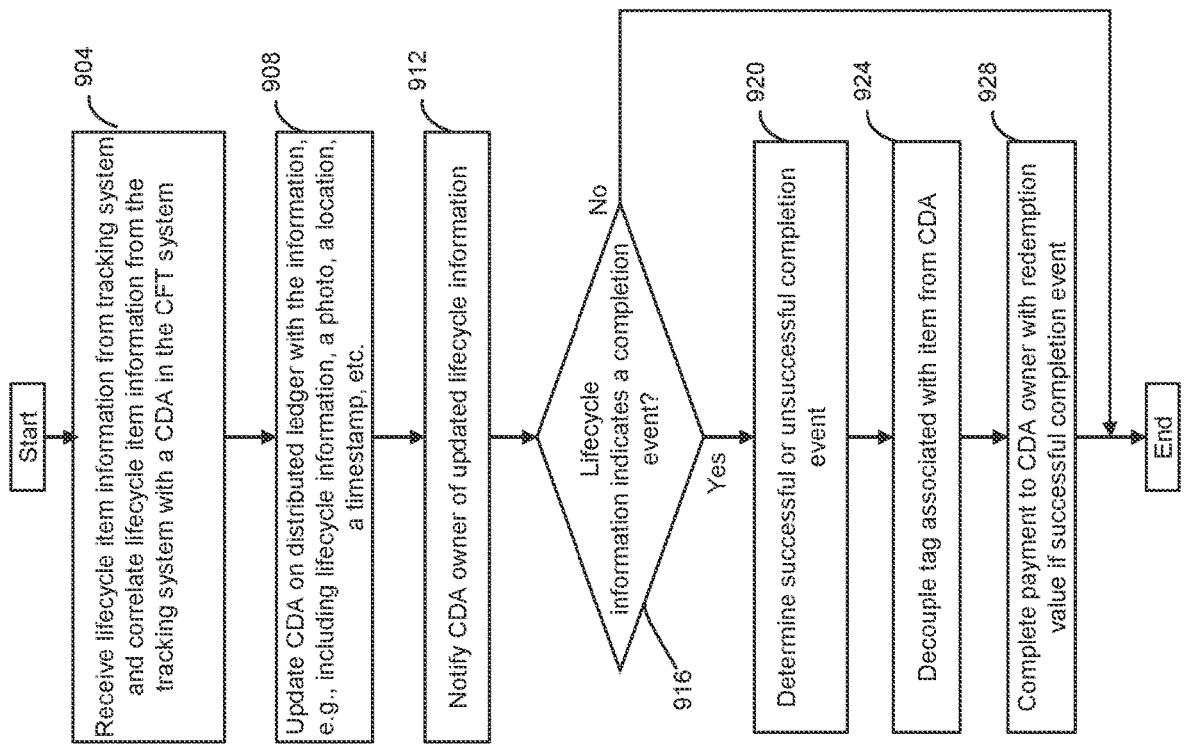
FIG. 9 is a flowchart depicting updating a CDA on a CFT system based on information from a third-party tracking system, in accordance with some embodiments of the disclosure.

FIG. 9 is a flowchart depicting updating a CDA on a CFT system based on information from a tracking system, in accordance with some embodiments of the disclosure. Control begins at 904 to receive lifecycle item information from a tracking system such as the operator tracking system 130 and correlate lifecycle item information produced by the tracking system with a CDA in the CFT system 100, e.g., based on identical identifiers used in both systems or by correlating an identifier used in the tracking system with an identifier used in the CFT system 100. As mentioned above, operators may be required such as by law or regulation to report certain types of information to the compliance authority via the third-party tracking system, and this information can be used by the CFT application 150 to create and update CDAs. Also as mentioned above, the CFT application 150 can receive information from the tracking system in various ways, e.g., reports from the tracking system obtained and uploaded to the CFT application 150 by the operator, direct access to the tracking system by the CFT application 150, information "pushed" by the tracking system to the CFT application 150, etc. Control continues to 908 to update the CDA on the digital public ledger with the information. The CDA is updated (which could also be updated off-chain based on the tag identifier or the unique ID of the CDA) with information such as lifecycle information, a photo, a location, a timestamp, etc. Control continues to 912 to optionally notify the CDA owner of updated lifecycle information. In various implementations, such as when the CDA is not owned, step 912 may be skipped or optional. Control proceeds to 916 to determine if lifecycle information indicated that the corresponding item (e.g., plant) has been reached a completion event. If no, control ends. If yes, control continues to 920 to determine if the completion event represents a successful completion event or an unsuccessful completion event. Then, control continues to 924 to decouple the RFID tag associated with the item from the NFT (that is, decoupling the identifier of the RFID tag and the unique ID of the NFT). Control then proceeds to 928 to complete payment to CDA owner with the redemption value if the completion event was a successful completion event. Then, control ends.

While the present disclosure often uses cannabis plants as examples of lifecycle items, it should be noted that the CFT system 100 can support the use of CDAs for a variety of lifecycle items including regulated and unregulated lifecycle items that could benefit from the funding provisions of the CFT system 100. As noted previously, the CFT system can incorporate the identifier used by the third-party tracking system or an identifier that can be correlated with the identifier used by the third-party tracking system. The CDA may be offered for sale to users of the CFT system, e.g., to prefund operations or for any other purpose chosen by the operator. For example, the sales of these CDAs can infuse presale capital into cannabis operators, which in turn could help operators invest in additional plants, technology, etc. Also, using this blockchain technology of the digital public ledger could ensure that once a regulated industry becomes federally legal, it will allow companies to publicly track their regulated lifecycle items in U.S. interstate commerce and abroad, ultimately, leading them to be first out of the gate for interstate commerce in a safe and decentralized way. That is, using Ethereum Network Blockchain or a similar technology could allow for investments associated with regulated lifecycle items such as cannabis plants from operators (and in some cases investments in such regulated lifecycle items and industries), as well as tracking by users and the digital public ledger, without government monitoring/interference.

It is envisioned that the CFT application 150 could be integrated with the operator tracking system 130 or the third-party tracking system 190.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., CFT application 150, operator device 109, and user device 115, including any CFT mobile application) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of the present disclosure. Modifications and adaptations to these embodiments will be apparent to those skilled in the art, and the general principles defined herein can be applied to other implementations without departing from the scope of this disclosure. Thus, the present disclosure is not intended to be limited to the implementations shown herein but instead is to be accorded the broadest scope consistent with the novel features and principles disclosed herein.

What is claimed is:

1. A method for providing a cryptographic digital asset marketplace for monitoring a lifecycle item through an item lifecycle by a commodities fungible token (CFT) application in a manner that is verifiable using data provided to a compliance authority, wherein the lifecycle item is a regulated lifecycle item that is subject to mandated tracking and compliance reporting to the compliance authority, the method comprising:

receiving, by the CFT application, an identifier associated with the lifecycle item used by the operator to report lifecycle item information to the compliance authority;

receiving, by the CFT application, a set of characteristics for the lifecycle item;

causing, by the CFT application, creation of a cryptographic digital asset for the lifecycle item and recording of the cryptographic digital asset in a digital ledger, the cryptographic digital asset being associated with the identifier and the set of characteristics;

presenting, by the CFT application, the cryptographic digital asset for sale through a marketplace accessible over a communication network, the marketplace enabling purchase of the cryptographic digital asset by a user via a user device over the communication network;

receiving, by the CFT application, notification of a purchase operation for purchase of the cryptographic digital asset by the user, wherein the purchase operation is associated with terms including at least a sale price for the cryptographic digital asset and a redemption value for the cryptographic digital asset that is greater than the sale price and is conditional on a predetermined successful completion event defined for the lifecycle item;

causing, by the CFT application, updating of the cryptographic digital asset in the digital ledger to identify the user as an owner of the cryptographic digital asset and to include a smart contract providing immutable evidence of the terms of the purchase operation;

initiating, by the CFT application, distribution of funds directly or indirectly from a user account to an operator account for the sale price;

receiving, by the CFT application, a final disposition of the lifecycle item that is reported to the compliance authority, the final disposition representing one of (a) the predetermined successful completion event defined for the lifecycle item or (b) an unsuccessful completion event defined for the lifecycle item, and being verifiable using the information reported to the compliance authority;

causing, by the CFT application, updating of the cryptographic digital asset in the digital ledger based on the final disposition of the lifecycle item; and when the final disposition is associated with the predetermined successful completion event defined for the lifecycle item, automatically initiating, by the CFT application, execution of the terms of the smart contract in a self-executing manner to cause distribution of funds directly or indirectly from the operator account to the user account in accordance with the redemption value.

2. The method of claim 1, wherein presenting the cryptographic digital asset for sale through a marketplace comprises:
presenting the cryptographic digital asset pre-mint.

3. The method of claim 1, wherein presenting the cryptographic digital asset for sale through a marketplace comprises:
minting the cryptographic digital asset; and
presenting the minted cryptographic digital asset for sale.

4. The method of claim 1, wherein the identifier includes at least one of an RFID, a barcode, or a quick release (QR) code.

5. The method of claim 1, wherein the lifecycle item is an agricultural item or product of an agricultural item.

6. The method of claim 1, wherein the set of characteristics comprises at least one of an item description, an item type, an item size, an item photograph or drawing, item health data, item appearance data, or a timestamp.

7. The method of claim 1, wherein the cryptographic digital asset is a token, fungible token, or non-fungible token (NFT).

8. The method of claim 1, wherein at least some of the characteristics are stored in a database associated with the CFT application.

9. The method of claim 1, wherein the predetermined successful completion event defined for the lifecycle item is the lifecycle item reaching a predetermined maturity criterion.

10. The method of claim 1, further comprising:
providing, by the CFT application, an interface through which the operator and the user can negotiate at least one of the sale price or the redemption value.

11. The method of claim 1, wherein at least one of the identifier, the characteristics, or the final disposition is received from the operator via an operator input device.

12. The method of claim 1, wherein at least one of the identifier, the characteristics, of the final disposition is received directly or indirectly from an operator tracking system.

13. The method of claim 1, further comprising:
receiving, by the CFT application, subsequent information for the lifecycle item; and
updating, by the CFT application, the cryptographic digital asset in the digital ledger based on the subsequent information.

14. The method of claim 1, further comprising:
presenting, by the CFT application, performance information for the operator relating to past lifecycle items offered by the operator through the CFT application so that the user can evaluate the sale price or redemption value.

15. A system for providing a cryptographic digital asset marketplace for monitoring a lifecycle item through an item lifecycle by a commodities fungible token (CFT) application in a manner that is verifiable using data provided to a compliance authority, wherein the lifecycle item is a regulated lifecycle item that is subject to mandated tracking and compliance reporting to the compliance authority, the system comprising:
- at least one processor coupled to at least one non-transitory memory containing instructions which, when executed by the at least one processor, implement a CFT application that performs processes comprising:
  - receiving, by the CFT application, an identifier associated with the lifecycle item used by the operator to report lifecycle item information to the compliance authority;
  - receiving, by the CFT application, a set of characteristics for the lifecycle item;
  - causing, by the CFT application, creation of a cryptographic digital asset for the lifecycle item and recording of the cryptographic digital asset in a digital ledger, the cryptographic digital asset being associated with the identifier and the set of characteristics;
  - presenting, by the CFT application, the cryptographic digital asset for sale through a marketplace accessible over a communication network, the marketplace enabling purchase of the cryptographic digital asset by a user via a user device over the communication network;
  - receiving, by the CFT application, notification of a purchase operation for purchase of the cryptographic digital asset by the user, wherein the purchase operation is associated with terms including at least a sale price for the cryptographic digital asset and a redemption value for the cryptographic digital asset that is greater than the sale price and is conditional on a predetermined successful completion event defined for the lifecycle item;
  - causing, by the CFT application, updating of the cryptographic digital asset in the digital ledger to identify the user as an owner of the cryptographic digital asset and to include a smart contract providing immutable evidence of the terms of the purchase operation;
  - initiating, by the CFT application, distribution of funds directly or indirectly from a user account to an operator account for the sale price;
  - receiving, by the CFT application, a final disposition of the lifecycle item that is reported to the compliance authority, the final disposition representing one of (a) the predetermined successful completion event defined for the lifecycle item or (b) an unsuccessful completion event defined for the lifecycle item, and being verifiable using the information reported to the compliance authority;
  - causing, by the CFT application, updating of the cryptographic digital asset in the digital ledger based on the final disposition of the lifecycle item; and
  - when the final disposition is associated with the predetermined successful completion event defined for the lifecycle item, automatically initiating, by the CFT application, execution of the terms of the smart contract in a self-executing manner to cause distribution of funds directly or indirectly from the operator account to the user account in accordance with the redemption value.

16. The system of claim 15, wherein presenting the cryptographic digital asset for sale through a marketplace comprises:
- presenting the cryptographic digital asset pre-mint.

17. The system of claim 15, wherein presenting the cryptographic digital asset for sale through a marketplace comprises:
- minting the cryptographic digital asset; and
- presenting the minted cryptographic digital asset for sale.

18. The system of claim 15, wherein the identifier includes at least one of an RFID, a barcode, or a quick release (QR) code.

19. The system of claim 15, wherein the lifecycle item is an agricultural item or product of an agricultural item.

20. The system of claim 15, wherein the set of characteristics comprises at least one of an item description, an item type, an item size, an item photograph or drawing, item health data, item appearance data, or a timestamp.

21. The system of claim 15, wherein the cryptographic digital asset is a token, fungible token, or non-fungible token (NFT).

22. The system of claim 15, wherein at least some of the characteristics are stored in a database associated with the CFT application.

23. The system of claim 15, wherein the predetermined successful completion event defined for the lifecycle item is the lifecycle item reaching a predetermined maturity criterion.

24. The system of claim 15, further comprising:
- providing, by the CFT application, an interface through which the operator and the user can negotiate at least one of the sale price or the redemption value.

25. The system of claim 15, wherein at least one of the identifier, the characteristics, or the final disposition is received from the operator via an operator input device.

26. The system of claim 15, wherein at least one of the identifier, the characteristics, of the final disposition is received directly or indirectly from an operator tracking system.

27. The system of claim 15, further comprising:
- receiving, by the CFT application, subsequent information for the lifecycle item; and
- updating, by the CFT application, the cryptographic digital asset in the digital ledger based on the subsequent information.

28. The system of claim 15, further comprising:
- presenting, by the CFT application, performance information for the operator relating to past lifecycle items offered by the operator through the CFT application so that the user can evaluate the sale price or redemption value.

29. A computer program product comprising at least one tangible non-transitory computer-readable medium storing processor-executable instructions which, when executed by at least one processor, implement a commodities fungible token (CFT) application for providing a cryptographic digital asset marketplace for monitoring a lifecycle item through an item lifecycle in a manner that is verifiable using data provided to a compliance authority, wherein the lifecycle item is a regulated lifecycle item that is subject to mandated tracking and compliance reporting to the compliance authority, the CFT application configured to perform processes comprising:
- receiving, by the CFT application, an identifier associated with the lifecycle item used by the operator to report lifecycle item information to the compliance authority;

receiving, by the CFT application, a set of characteristics for the lifecycle item;

causing, by the CFT application, creation of a cryptographic digital asset for the lifecycle item and recording of the cryptographic digital asset in a digital ledger, the cryptographic digital asset being associated with the identifier and the set of characteristics;

presenting, by the CFT application, the cryptographic digital asset for sale through a marketplace accessible over a communication network, the marketplace enabling purchase of the cryptographic digital asset by a user via a user device over the communication network;

receiving, by the CFT application, notification of a purchase operation for purchase of the cryptographic digital asset by the user, wherein the purchase operation is associated with terms including at least a sale price for the cryptographic digital asset and a redemption value for the cryptographic digital asset that is greater than the sale price and is conditional on a predetermined successful completion event defined for the lifecycle item;

causing, by the CFT application, updating of the cryptographic digital asset in the digital ledger to identify the user as an owner of the cryptographic digital asset and to include a smart contract providing immutable evidence of the terms of the purchase operation;

initiating, by the CFT application, distribution of funds directly or indirectly from a user account to an operator account for the sale price;

receiving, by the CFT application, a final disposition of the lifecycle item that is reported to the compliance authority, the final disposition representing one of (a) the predetermined successful completion event defined for the lifecycle item or (b) an unsuccessful completion event defined for the lifecycle item, and being verifiable using the information reported to the compliance authority;

causing, by the CFT application, updating of the cryptographic digital asset in the digital ledger based on the final disposition of the lifecycle item; and when the final disposition is associated with the predetermined successful completion event defined for the lifecycle item, automatically initiating, by the CFT application, execution of the terms of the smart contract in a self-executing manner to cause distribution of funds directly or indirectly from the operator account to the user account in accordance with the redemption value.

* * * * *